(No Model.) 7 Sheets—Sheet 4.
J. H. PENDLETON & A. BRYSON.
CABLE RAILWAY.
No. 479,921. Patented Aug. 2, 1892.
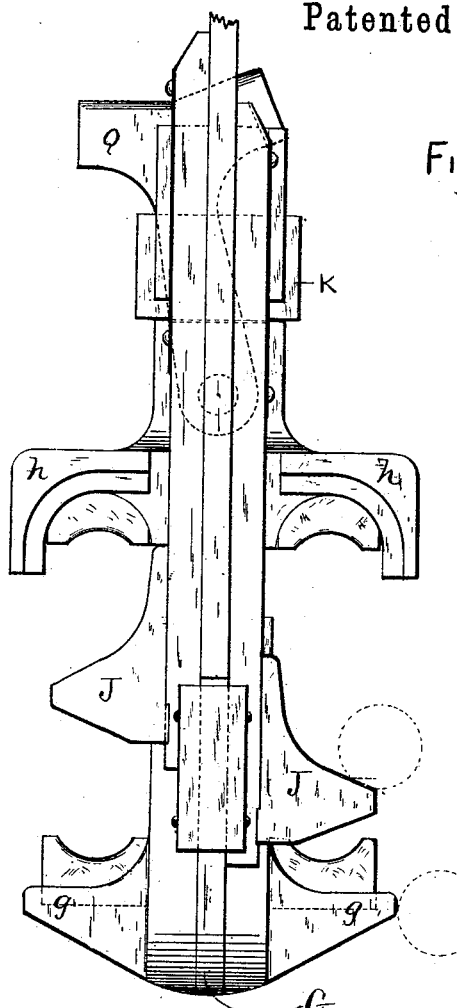
Fig. 5.
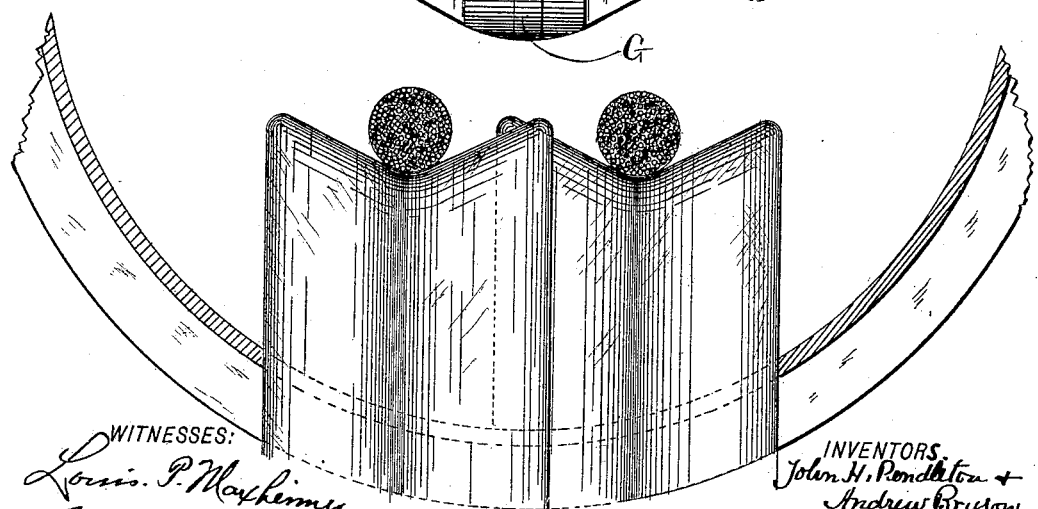
WITNESSES:
INVENTORS
John H. Pendleton +
Andrew Bryson
BY
ATTORNEYS.

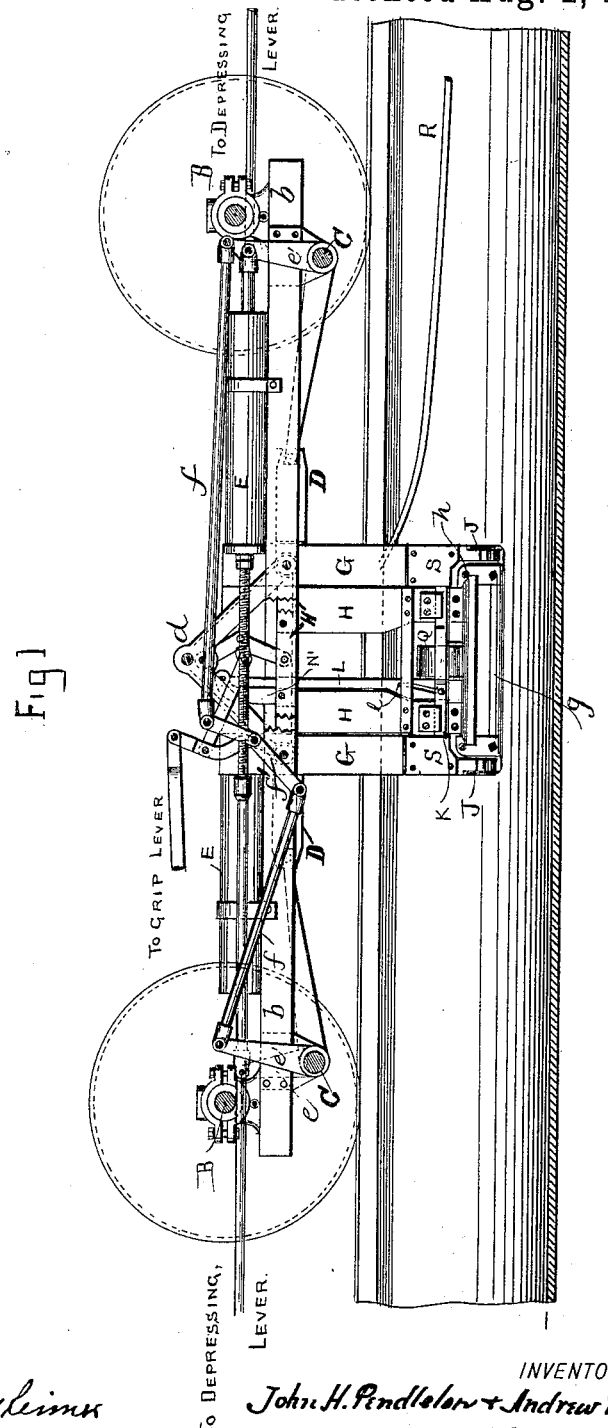

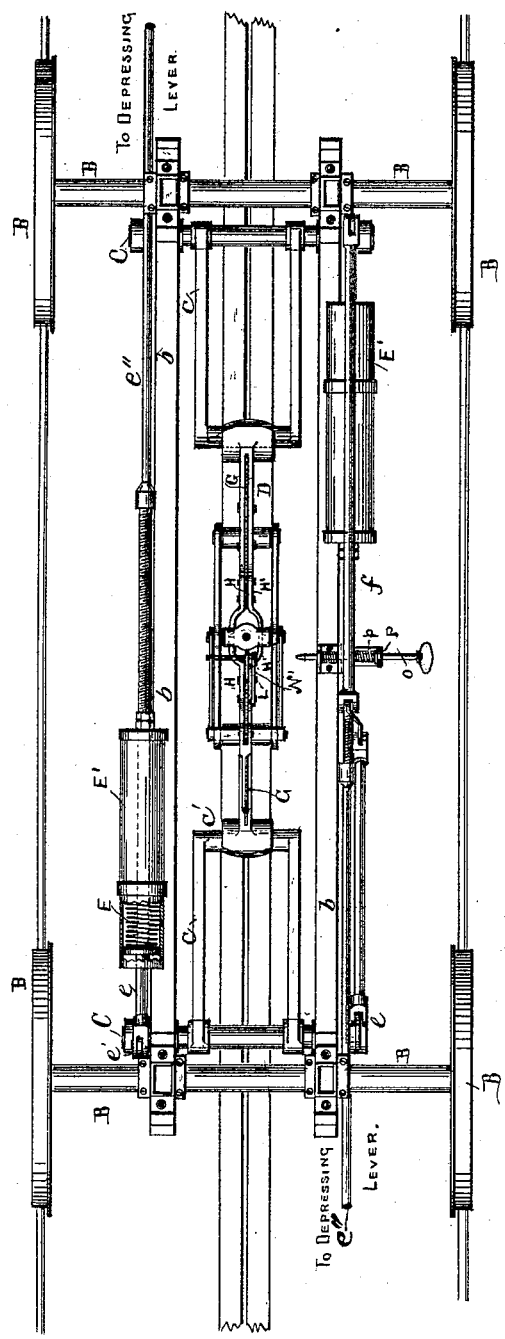

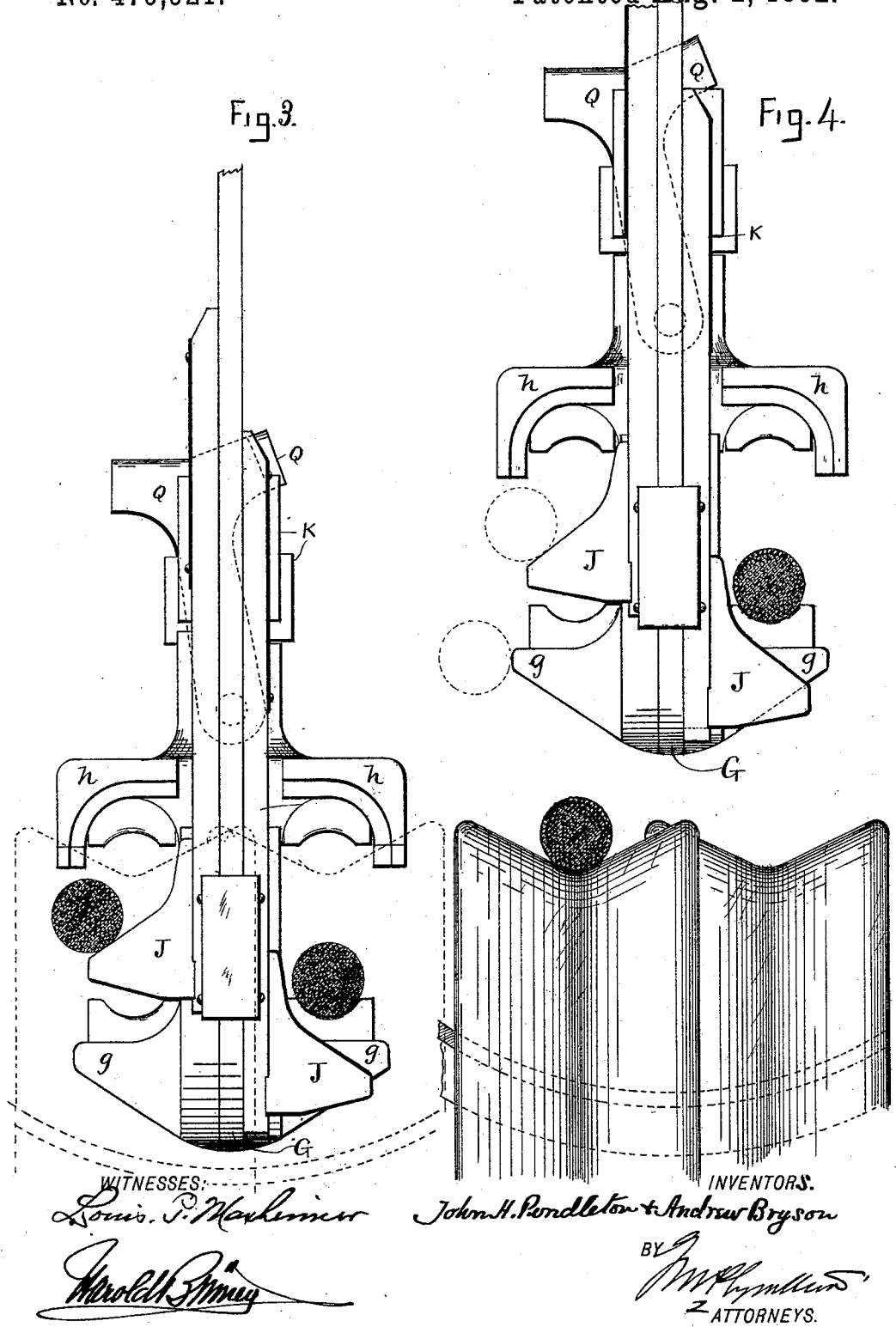

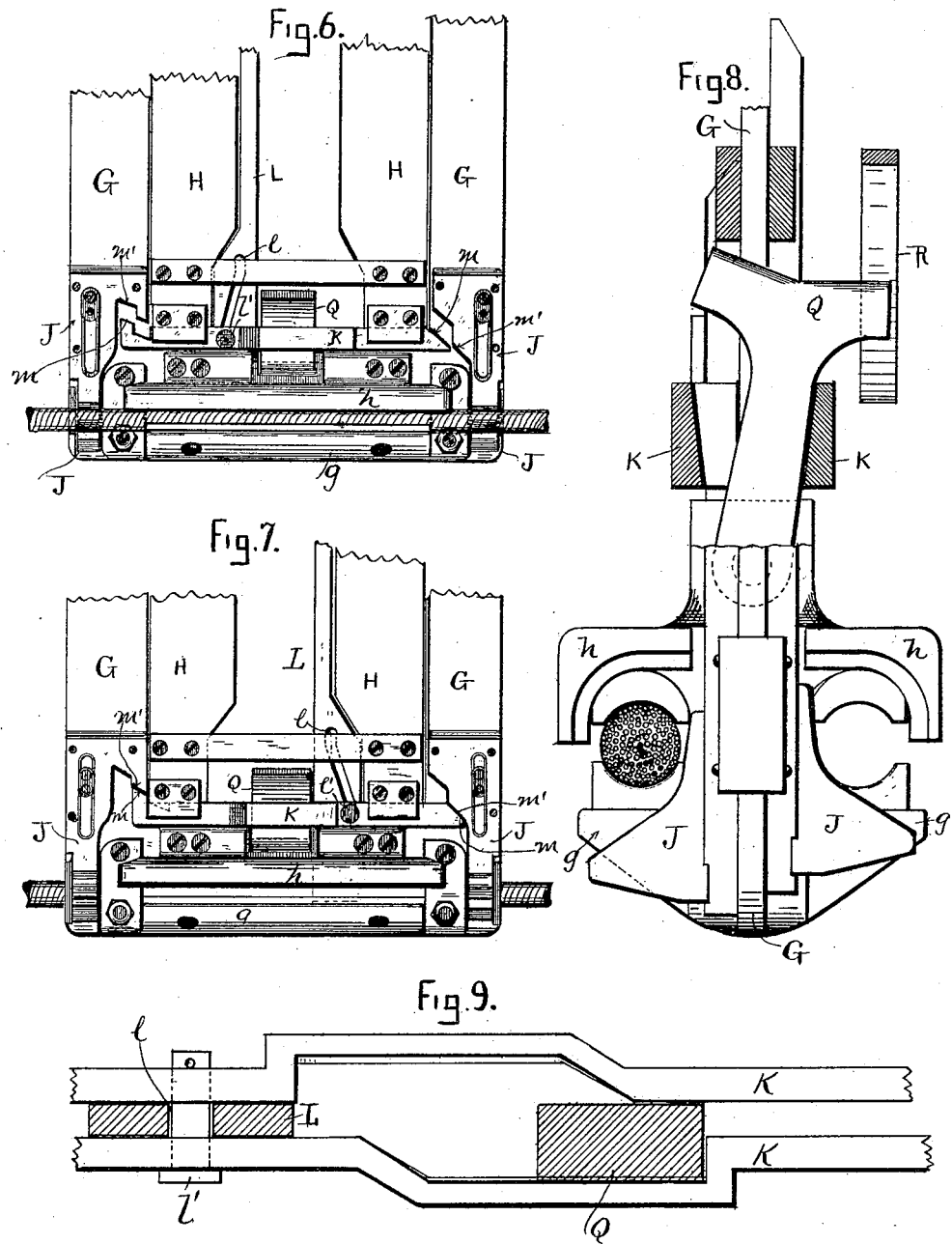

(No Model.) 7 Sheets—Sheet 6.
J. H. PENDLETON & A. BRYSON.
CABLE RAILWAY.
No. 479,921. Patented Aug. 2, 1892.
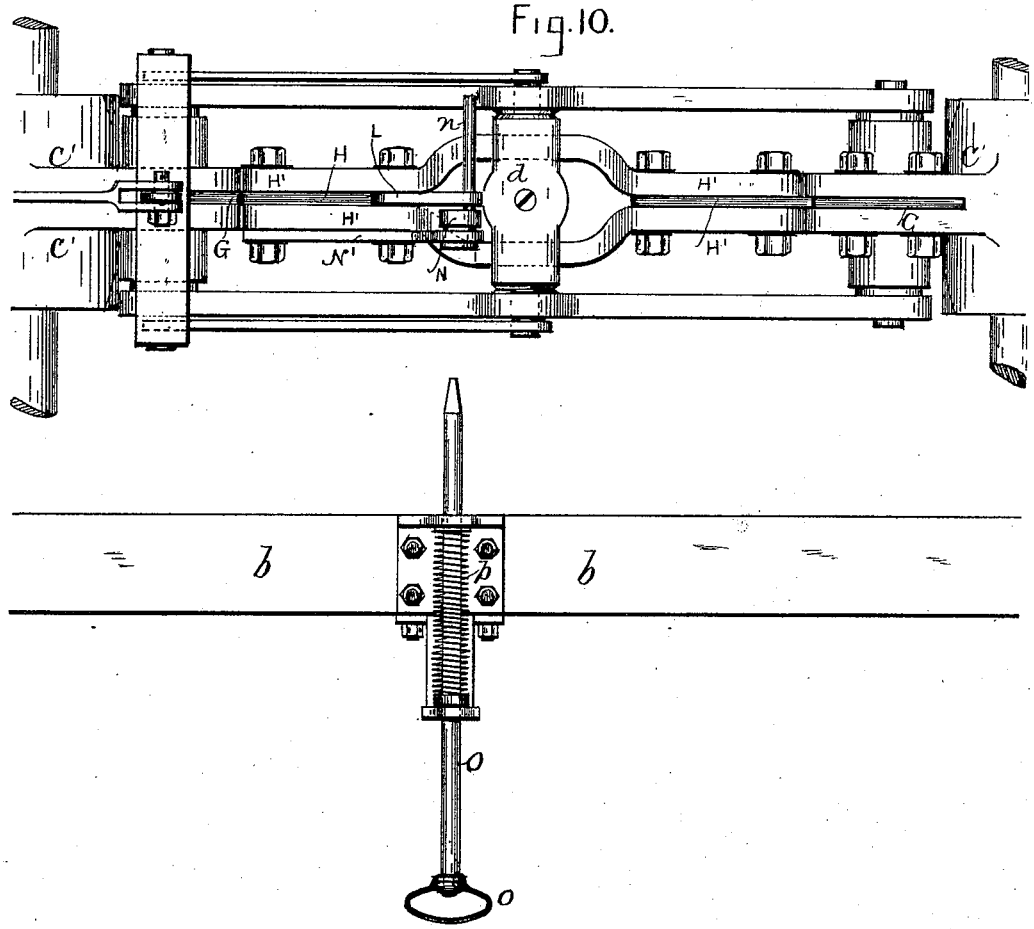
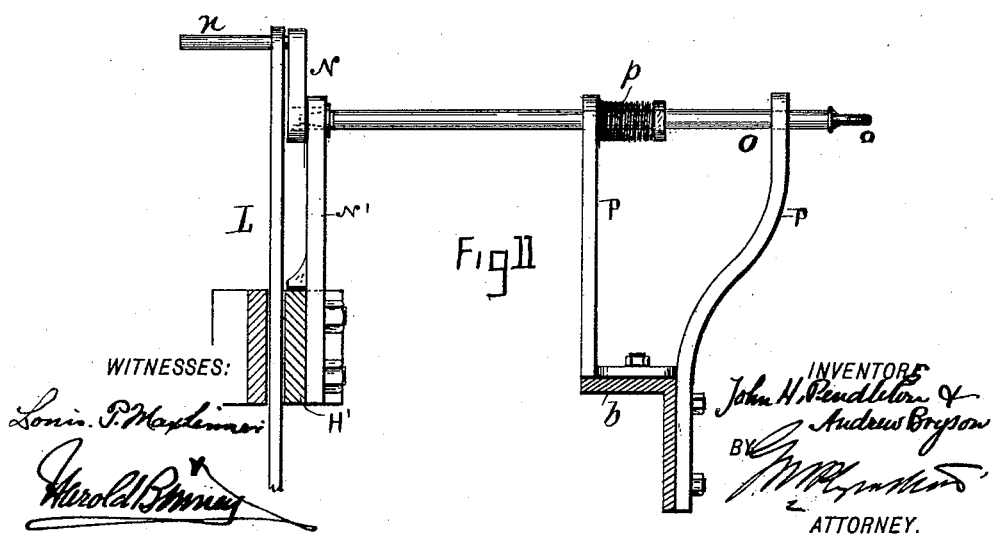

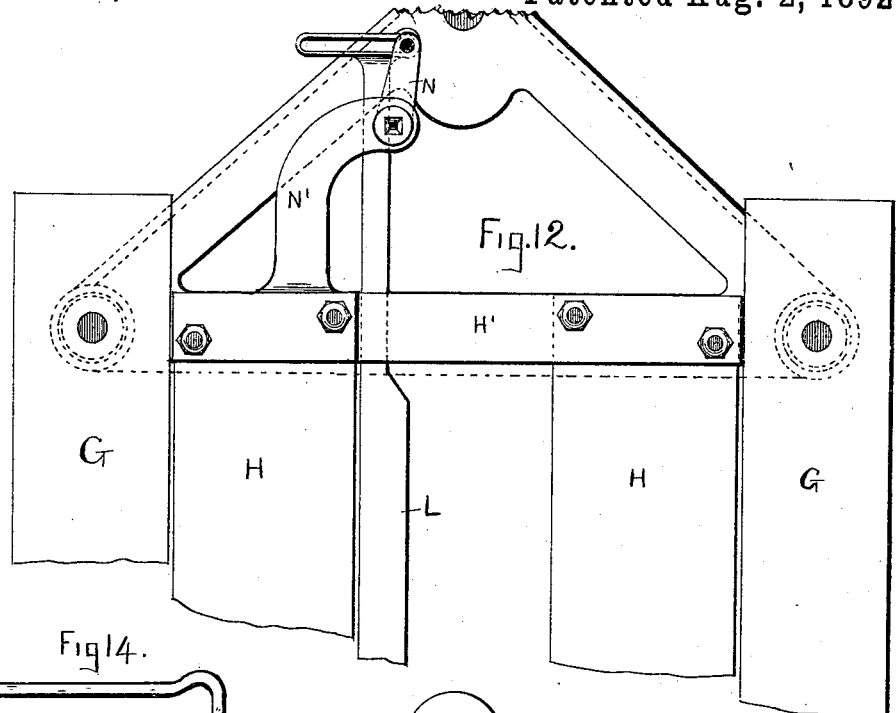
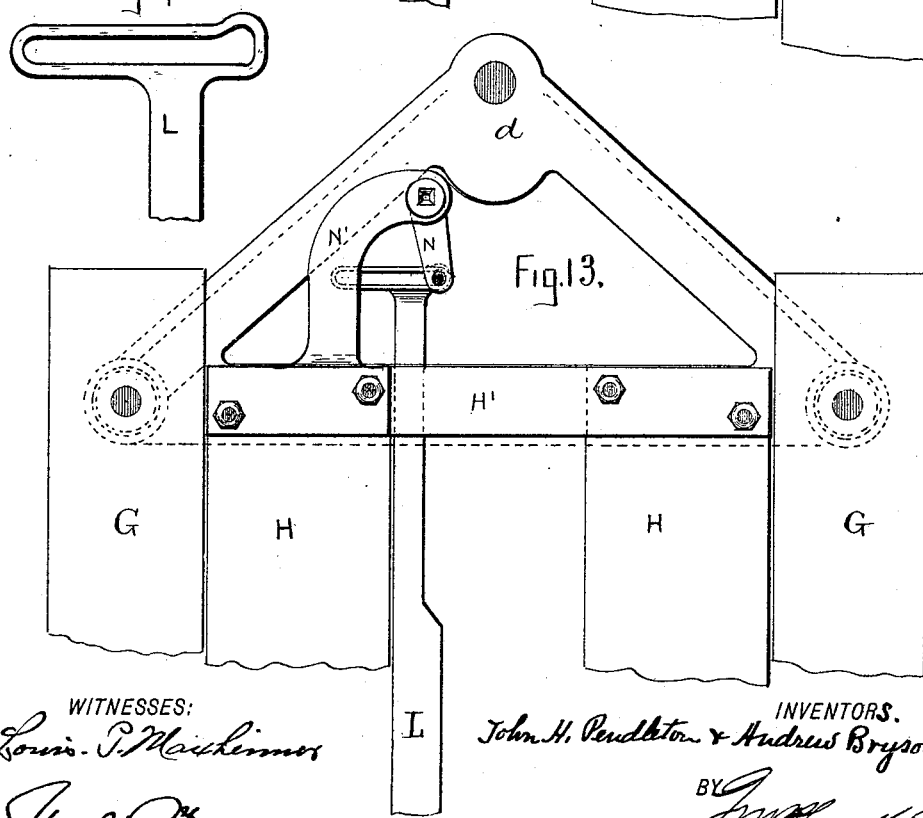

UNITED STATES PATENT OFFICE.

JOHN H. PENDLETON, OF BROOKLYN, AND ANDREW BRYSON, OF NEW YORK, ASSIGNORS TO THE RAPID TRANSIT CABLE COMPANY, OF NEW YORK, N. Y.

CABLE RAILWAY.

SPECIFICATION forming part of Letters Patent No. 479,921, dated August 2, 1892.

Application filed May 28, 1892. Serial No. 434,754. (No model.)

*To all whom it may concern:*

Be it known that we, JOHN H. PENDLETON, of Brooklyn, and ANDREW BRYSON, of New York, State of New York, have invented new and useful Apparatus for Cable Railways, of which the following is a description, reference being taken to the accompanying drawings, which form part of this specification.

Our invention relates more particularly to a double gripper and the mechanism for actuating it adapted for use in cable railways employing two cables.

Its purpose and object is to enable the operator to pick up either cable at will, to drop them when desired, to insure a positive operation of the parts, and while carrying out and attaining all these ends to effect a great simplification of structure and absolute reliability of operation.

In addition to these features our invention contemplates a spring-support for the gripper and an arrangement whereby it may be drawn down out of its normal position at certain points of the road-bed for passing curves and accomplishing certain other results, and a simple means for obtaining the greatest pressure on the jaws of the gripper without unnecessary travel of the gripping-lever.

To these and certain incidental ends our invention is embodied in the apparatus and its several parts and features, constructed, arranged, combined, and used substantially in the manner and for the purposes hereinafter described, illustrated, and claimed.

In the accompanying drawings, illustrative of our invention, Figure 1 is an elevation, and Fig. 2 a plan view, of our gripper with its frame and operating attachments. Figs. 3, 4, and 5 are end views of the jaws and other parts of our invention which are beneath the road-bed. Figs. 6 and 7 are elevations from each side of the parts shown in Figs. 3, 4, and 5, the gripper being in its closed position. Fig. 8 is an end view of the same, partly in section, to show certain details. Fig. 9 is a detail view of a part of the apparatus by which we control the position of the apparatus for automatically lowering the gripper at certain parts of the road-bed. Figs. 10 and 11 are views showing the hand-rod-and-crank motion by which we shift the position of the lowering device and adjust the jaw attachments and deflecting-shoes to enable us to pick up either cable. Figs. 12 and 13 show the two extreme positions of the crank of this last-named apparatus, and Fig. 14 the slot in which the crank-pin travels.

Like letters of reference in these figures indicate like parts.

John H. Pendleton, one of the applicants in this case, in an application filed by him on the 10th day of March, 1892, and serially numbered 424,375, set forth in full and claimed, broadly, a set of apparatus for accomplishing many of the objects and purposes above named, among others, that of picking up either cable at will, in the apparatus therein set forth the adjustment and operation was accomplished entirely by apparatus controlled by the hand-levers upon the platforms. In a later application filed herewith, and serially numbered 436,482, patented herewith, are set forth improvements in the construction and details of parts without modification of the general plan and purposes of the invention claimed in the earlier case. The present invention, while similar in many respects, differs in the arrangement and operation of many parts and mechanisms. Among other differences the present invention contemplates a device for adjusting the deflecting-shoes from the side of the car by a special hand apparatus, and this of course necessitates corresponding changes in the shoes themselves. The deflecting-shoes in the present invention are in some respects similar to those described in the said two applications. Instead, however, of the simple lost motion for causing the shoes upon one side of the gripper to always be raised by the upper jaws before those upon the other side and instead of the projecting lip or finger upon one of the upper jaws, in the present invention we employ a sliding carrier, which may be thrown into position to raise the shoes upon one side as the upper jaws rise before those upon the other, or when at the other end of its travel to raise the latter shoes first. This carrier travels horizontally and is actuated by a plate separated from the jaw-supporting plates, which extend up through the slot to a crank and a hand-rod at the side of the car, by which the operator controls it. The travel of this sliding carrier also serves to throw out and withdraw from one side of the gripper to the other a pair of laterally-projecting lugs or ears. These lugs bear against depressing-rails at certain points in the road-bed and thereby depress the gripper, that the cable may be fed into the proper sheaves or pulleys in passing around curves. As is well known in cable-railway engineering, the outer cable, or the one farther from the center of curvature, must pass around the curve below the other cable. We therefore place the depressing-rails beneath the inner side of the slot at the curves and so arrange our projecting lugs that they are thrown out into operative position upon the side of the gripper opposite to the side jaws that hold the cable. When the outer cable is in the gripper, the lugs projecting from the other side of the gripper will come in contact with the depressing-rail and the gripper be lowered to a position for feeding the cable into the lower set of curve-pulleys; but when the cable within the gripper is the inner cable corresponding to the upper curve-pulleys the lug projecting on the other or outer side of the gripper will not meet the deflecting-rail and the gripper remains in its raised or normal position. To permit this raising and lowering of the gripper, we support it on suitable bell-crank levers by helical compression-springs. When the gripper is lowered, the springs are compressed, and they therefore raise the gripper to its normal position as soon as the depressing-rails have been passed. Hand wheels or levers upon the platforms or at other suitable points on the car may be connected with these bell-cranks and springs, so that the gripper may be depressed by hand to pick up either cable at will, according to the position of the sliding carrier and deflecting-shoes. Such are the main differences between the subjects of this application and the two applications above referred to.

The details of construction as illustrated by the accompanying drawings will now be described as a particular embodiment of the general features above indicated.

In Figs. 1 and 2 we show the general arrangement of our apparatus, the connecting-rods for the gripping and depressing levers being broken off because the details of these levers are not material to this present invention.

The axles and car-wheels are indicated by the letter B. To the axles are hung the side rails $b$ of my gripper apparatus. These rails are preferably angle-irons provided with hangers or bearings for the axles bolted to their ends. Near each end of the rails and secured to suitable brackets are transverse shafts C, provided with double bell-crank-lever arms $c$, terminating in cross rods or shafts $c'$, as shown, which lie in channels in the gripper-head D and support the weight of the gripper. Helical springs E, Fig. 2, inclosed in spring-boxes E' and connected to the shafts C by rods $e$, and bell-crank levers $e'$ retain the arms $c$ in their raised position against the weight of the gripper. To insure equal and parallel rise and fall of the two ends of the gripper-head, we connect the shafts C by equalizing-cranks and connecting-rods $f$, placing a double-armed lever $f'$ between the rods $f$ to reverse the relative rotation of the two shafts. The precise details and arrangements of these parts may of course be modified without departing from the general principles involved. The spring-rods $e$ may be connected with the depressing-levers upon the platform by means of rods $e''$, and in this way the gripper may be readily manually operated to pick up the cables and for other purposes. When it has been depressed either by hand or by the automatic device, which will be hereinafter more fully described, the springs E are put in compression, and when the depressing force is removed they again raise the gripper to its normal position.

In Figs. 3 to 9, inclusive, are shown the details of our deflecting-shoes and depressing-lugs, and in Figs. 10 to 14, inclusive, the details of the hand-rod and crank, and the connecting-plate which runs through the slot for controlling the shoes and depressing-lugs.

At G are shown the supporting plates or shanks for the lower jaws of our gripper, secured at their upper end to the gripper-head D, and triangular frames $d$, which carry the toggle movement for closing the jaws and gripping the cable. The lower jaws of our gripper are indicated at $g$. Dies of suitable material are placed in the jaws in any convenient manner to form wearing-faces for the cable. The supporting plates or shanks H of the upper jaws $h$ extend up through the slot to the cross-head H', which slides vertically upon the shanks G of the lower jaws and to which is secured the lower link of the toggles for closing the jaws, as in Fig. 1. As we make no claims of the details of the toggles in this case, we will not further describe them.

At each end of the gripper and upon each face of the plates G are secured by a pin-and-slot connection our deflecting-shoes J. The pin-and-slot connections are not, however, essential, as other sliding connections may replace them. The shoes are of such shape and the slots of such length that when the shoes are at the lowest position upon the plates G their deflecting or shielding faces are below the faces of the dies in the lower jaws and therefore do not interfere with the cable. When, however, the deflecting-shoes are raised, these faces rise above the jaws, allowing the cable to slide outward and downward, as illustrated in dotted lines in Fig. 4, out of the gripper and onto the supporting-pulleys. In the application Serial No. 424,375 were explained the means by which as the jaws partially opened, the deflecting-shoes were raised above the lower jaw upon one side of the gripper, permitting the cable to be admitted and retained only within the other lower jaw. When the jaws were opened further, the deflecting shoes upon both sides were raised and formed shields for both the lower jaws. In order to admit the cable upon the side having the higher shoes, the jaws were opened far enough to allow the cable to be received, yet not enough to raise the deflecting-shoes. At this position the opening between the other jaws was so narrow that the other cable could not pass in. In the present invention the openings between both pairs of jaws are equal, and therefore in order to take either cable without the other we provide means of reversing the operation of our shoes, causing those upon the other side to rise first as the jaws open.

In Figs. 3 and 4 the left-hand shoes are shown raised to throw out the cable, the right-hand shoes not yet being brought into play.

In Fig. 5 the jaws are shown wide open and the shoes upon both sides raised to shield the lower jaws, so that neither cable can be retained in the gripper.

In Fig. 6 we show a side view of our gripper as closed, the shoes which appear being at their lowest position and supported by the pins and slots, as described.

At K is shown a pair of sliding plates arranged to travel horizontally upon the plates H. These plates K are provided with inclined faces $m$ at each end, arranged to slide under corresponding faces $m'$ upon the sliding supports of our deflecting-shoes. These faces $m$ engage with the corresponding faces of the deflecting-shoes upon one side of the gripper when those upon the other side of the gripper are out of engagement. The plates K, with their inclined faces $m$, form what we will term our "sliding carrier." When the carrier is forced to the left, as viewed in Fig. 6, and to the right, as seen from the other side, the faces $m$ $m'$ upon the side shown in Fig. 6 do not engage. Upon the other side, however, Fig. 7, the inclined faces $m$ are forced under the co-operating faces $m'$ of the deflecting-shoes J and carry the shoes upward about half an inch, bringing the deflecting-faces of the shoes almost into contact with the cable, (if it be within the jaws.) If the jaws be now opened, the shoes will be carried upward with the upper jaw and will throw out the cable. The shoes upon the first side, Fig. 6, will remain inactive until some part of the carrier is brought against the sliding plates of the shoes J. The carrier and the shoe-plates are cut away to allow the carrier to travel upward about an inch before this lost motion is taken up, so that the shoes upon one side are raised about an inch and a half above the others, and are therefore brought into their operative position without the lower ones coming in contact with the cable. When the carrier is at the other end of its travel, the relative operation of the shoes upon the two sides is reversed, the lost motion being transferred to the other side. The carrier is controlled and actuated from above by means of a vertically-sliding plate L, provided with an inclined slot $l$, within which travels a pin $l'$ upon the carrier. The plate L extends up through the slot to a crank and a hand-rod for raising and lowering it. When the plate is raised, the sliding carrier K will be forced to one limit of its travel, and when the plate is lowered the carrier K is forced to the other end of its travel.

In Figs. 10 to 14 is shown our hand-rod and crank and the upper end of the plate L. The head of the plate is horizontally slotted to receive the crank-pin $n$ of the crank N, which latter is centered in a suitable bracket N', secured to the sliding cross-head H'. The crank turns through an angle of about one hundred and eighty degrees, dead-center to dead-center, to raise and lower the plate L, the pin traveling back and forth in the slot. The slot is provided with a recess at one end, as in Fig. 14, so that the crank-pin $n$ may pass into it and be retained thereby at either limit of the motion, Figs. 12 and 13. As the crank and crank-pin must rise and fall with the upper jaws of the gripper and as the carrier K should only be adjusted when the jaws are closed, we operate the crank by a rotary hand-rod O, having bearings in suitable brackets P upon one of the side rails $b$. The inner end of the hand-rod is provided with a pyramidal tip, which fits an axial recess of corresponding shape in the crank N. A spring $p$ withdraws the hand-rod O from the crank; but when the jaws are closed and the gripper is in its normal position the rod is exactly opposite the axial recess in the crank, and may therefore be pushed into it and the crank turned. When released, the spring $p$ again withdraws the rod O. The projecting end of the crank-pin $n$ may also be directly turned by hand through a trap-door in the flooring of the car.

We will now describe the projecting ears or lugs by which we automatically depress our gripper when it is necessary to take the cable from and feed it back into the lower curve-pulleys. Figs. 6, 7, 8, and 9 show these lugs and the manner in which they are operated by our sliding carrier K. The lugs are formed by an upright T-shaped body Q, pivoted on a horizontal axis at its lower end in a recess above the upper jaws of the gripper. The plates of the sliding carrier K spread apart at their center and surround the neck of the T. These portions of the plates are so formed, as in Fig. 9, that as the carrier moves from one end of its travel to the other the T-shaped part just described turns upon its axis through an angle of about fifteen degrees or sufficient to throw out the lug on one side of the gripper and draw in that upon the other side, as in Fig. 8. The lug is always out on the side opposite the lower deflecting-shoes—that is to say, it is upon the side that does not receive the cable. At curves depressing-rails are arranged within the trench to co-operate with these lugs, as in Fig. 1 at R. These rails are placed on the inner side of the trench, so that when the gripper passes from tangent to curve the lug, if it projects on the side toward the center of curvature, comes in contact with the rail, as in Fig. 8, and thereby lowers the gripper and causes the cable to be fed into the lower curve-pulleys. In the broader of the following claims we do not desire to limit ourselves to these precise features.

We have now set forth the manner in which we simultaneously adjust our gripper to receive either cable and adjust the depressing lugs, so that the gripper will be automatically lowered to accomplish the proper feeding of the cable back onto the curve-pulleys. We have also set forth the way in which the gripper may be lowered by hand to pick up either cable. When the jaws are so opened that but one lower jaw is shielded by the deflecting-shoes, the gripper may be forced down between the cables, and the cables, spread apart thereby, press inward between the jaws. When the gripper is raised, the cable on one side is thrown off by the deflecting-shoes and falls back upon its supporting-pulleys, while the other is carried up in the lower jaw and may be gripped by means of the hand lever or wheel which actuates the toggles. When it is desirable to remove the gripper from the car, it is only necessary to unbolt the connections to the gripping-lever or hand-wheel, and then by depressing the bell-cranks $c$, which support the gripper-head, the gripper may readily be removed from the supporting-shafts $c'$ and entirely detached from the car.

In Fig. 1 it may be seen that the sliding plates of the deflecting-shoes are covered and protected by plates S, which are removed in the other figures in order to show details. In similar manner we have omitted several other features and details of some mechanical importance, for these, not being the essentials of our invention, only tend rather to obscure than to set forth the more material features. We have, however, now fully explained our invention, and therefore without detailing the many variations and modifications which may readily suggest themselves to the skilled mechanic.

We claim as our own, and desire to secure by these Letters Patent, the following:

1. In combination, in a gripper for cable railways, a lower jaw, one or more supporting plates or shanks therefor, an upper jaw movable relatively to the said lower jaw, one or more supporting plates or shanks therefor, one or more sliding shoes for the said lower jaw arranged to be raised in position to shield the said lower jaws from the cable, a carrier movable upon the said upper jaw and arranged to raise the said deflecting-shoes with the said upper jaw and with or without lost motion between the said jaw and the said shoes, according to the position of the said carrier, and means for controlling the position of the said carrier, substantially as and for the purposes set forth.

2. In combination with the double jaws and jaw-supports of a double gripper, one or more deflecting-shoes for each of the said lower jaws for shielding them from the cables, pins and slots or other stops to limit the downward travel of the said shoes relatively to the said lower jaws, a carrier moving with and adjustable relatively to the said upper jaws and constructed to raise the said deflecting-shoes on one side simultaneously with the said upper jaws, but upon the other side to permit lost motion between the said shoes and the said jaws, the said carrier being adjustable to transfer the said lost motion from one side of the gripper to the other, and means for adjusting the said carrier, substantially as and for the purposes set forth.

3. In combination, in a gripper apparatus for cable railways, jaws and jaw-supports, deflecting-shoes relatively movable to both upper and lower jaws, but attached to the upper jaw by a lost-motion connection, and means for permitting or preventing such lost motion, substantially as and for the purposes set forth.

4. In combination, in a gripper for cable railways, a lower jaw, an upper jaw movable relatively to the said lower jaw, stops to limit the travel of the said shoes relatively to the said lower jaw, a carrier moving with the said upper jaw and constructed to raise the said shoes with the said upper jaw, but adjustable thereon to permit or prevent lost motion between the said shoes and the said upper jaw, and means for adjusting the said carrier, consisting of a plate L, provided with a slot inclined to its line of motion, a pin upon the said carrier traveling in the said inclined slot, a crank for actuating the said plate pivotally secured to and moving with the said upper jaw, and means for turning the said crank, substantially as and for the purposes set forth.

5. In combination, in a mechanism for raising and lowering a gripper for cable railways, one or more bell-crank levers, from which the said gripper is suspended, one or more rods $e$, sliding in suitable guides and connected to one or more of the arms of the said bell-crank levers, springs E for the said rods, counterbalancing the weight of the said gripper, and a connection between the bell-crank levers for causing them to turn equally, substantially as and for the purposes set forth.

6. In combination, in a gripper apparatus for cable railways, a gripper-head provided with horizontal channels for receiving supporting-shafts, a frame for the said gripper apparatus, a pair of shafts C, mounted upon the said frame, one or more lever-arms $c$ upon each of the said shafts terminating in a horizontal rod or shaft $c'$, fitting within one of the said horizontal channels in the gripper-head, one or more lever-arms $e'$ upon the said shafts C, one or more sliding rods connected with the said lever-arms $e'$, and springs for the said sliding rods, substantially as and for the purposes set forth.

7. In combination with a spring-supported gripper for cable railways, one or more laterally-projecting depressing lugs or ears Q for the said gripper, pivotally secured thereto, depressing-rails arranged at suitable positions for engaging with the said lugs, and a sliding carrier K, provided with inclined faces for altering the position of the said lugs to cause them to project from either side of the said gripper, substantially as and for the purposes set forth.

8. In combination with a gripper for cable railways, a sliding carrier K, one or more depressing lugs or ears Q, having a pivoted support extending through an opening in the said carrier, the said opening being so formed that its adjustment will cause the said support to turn and to alter the position of the said lugs, substantially as and for the purposes set forth.

9. In combination, in a gripper for cable railways, a lower jaw, one or more supporting plates or shanks therefor extending through the slot, an upper jaw movable relatively to the said lower jaw, one or more supporting-plates therefor, one or more sliding deflecting-shoes for the said lower jaw, arranged to be raised in position to shield the said lower jaw from the cable, a sliding carrier arranged to raise the said deflecting-shoes with the said upper jaw and with or without lost motion between the said jaw and the said shoes, according to the position of the said carrier, means for controlling the said carrier, and one or more depressing lugs or ears Q, adjustable by the movement of the said carrier, substantially as and for the purposes set forth.

10. In combination with the frame, jaws, and jaw-supports of a gripper apparatus, a crank mounted upon the supports of the movable jaw, a hand-rod for turning the said crank, mounted upon the said frame and adapted to engage with the said crank when the gripper is in its normal position, a spring for withdrawing the said rod from the said crank, and a vertically-sliding plate for operating certain attachments of the said gripper, provided with a horizontal slot for the crank-pin of the said crank, substantially as and for the purposes set forth.

11. In combination with the supporting-frame and the jaws and jaw-shanks of a gripper apparatus, and all arranged substantially as and for the purposes described, a crank mounted upon the shanks of the movable jaw or jaws, a rod for turning the said crank, mounted upon the said supporting-frame, and a vertically-reciprocating plate L, actuated by the said crank.

In testimony of the foregoing we have hereto set our hands this 27th day of May, 1892.

JOHN H. PENDLETON.
A. BRYSON.

Witnesses:
CORNELIUS BLISS,
HAROLD B. MILLER.